US010744385B2

(12) United States Patent
Kim et al.

(10) Patent No.: US 10,744,385 B2
(45) Date of Patent: Aug. 18, 2020

(54) SCREEN BASEBALL SYSTEM AND METHOD OF REALIZING LEFT-HANDED PITCHER AND RIGHT-HANDED PITCHER USING THE SAME

(71) Applicant: NEWDIN CONTENTS CO.,LTD., Seoul (KR)

(72) Inventors: Se Hwan Kim, Daegu (KR); Bong Kyung Ko, Daejeon (KR); Sang Hyun Joo, Daejeon (KR)

(73) Assignee: NEWDIN CONTENTS CO., LTD., Seoul (KR)

( * ) Notice: Subject to any disclaimer, the term of this patent is extended or adjusted under 35 U.S.C. 154(b) by 0 days.

(21) Appl. No.: 16/322,503

(22) PCT Filed: Jul. 14, 2017

(86) PCT No.: PCT/KR2017/007576
§ 371 (c)(1),
(2) Date: Feb. 1, 2019

(87) PCT Pub. No.: WO2018/038392
PCT Pub. Date: Mar. 1, 2018

(65) Prior Publication Data
US 2019/0269987 A1   Sep. 5, 2019

(30) Foreign Application Priority Data

Aug. 23, 2016   (KR) .................. 10-2016-0106732

(51) Int. Cl.
*A63B 69/00*   (2006.01)
*A63B 24/00*   (2006.01)
(Continued)

(52) U.S. Cl.
CPC .......... *A63B 69/0002* (2013.01); *A63B 24/00* (2013.01); *A63B 69/00* (2013.01);
(Continued)

(58) Field of Classification Search
CPC .......... A63B 69/00; G06F 15/18; A63F 13/01
See application file for complete search history.

(56) References Cited

U.S. PATENT DOCUMENTS 2,121,742 A * 6/1938 McLaughlin .......... A63C 19/00
                                                     473/499
4,463,950 A * 8/1984 Elkin .................. A63B 69/0002
                                                     473/451
(Continued)

FOREIGN PATENT DOCUMENTS

JP         09-276467 A      10/1997
KR    10-1996-0010035 A      4/1996
(Continued)

OTHER PUBLICATIONS

International Search Report for PCT/KR2017/007576 dated Sep. 29, 2017 from Korean Intellectual Property Office.

*Primary Examiner* — Eugene L Kim
*Assistant Examiner* — Christopher Glenn
(74) *Attorney, Agent, or Firm* — Revolution IP, PLLC (57) ABSTRACT

Disclosed are a screen baseball system, in which a pitching machine installed behind a screen pitches a ball toward a batting area through a pitching hole formed in the screen and a user hits the ball in the batting area, configured such that the case in which a virtual pitcher in an image projected on the screen is a left-handed pitcher and the case in which the virtual pitcher is a right-handed pitcher are realized when a ball is pitched through a single pitching hole, whereby the user who hits the ball in the batting area is capable of experiencing the pitch from the left-handed pitcher and the pitch from the right-handed pitcher, and a method of realizing a left-handed pitcher and a right-handed pitcher using the same.

6 Claims, 8 Drawing Sheets

(51) Int. Cl.
*A63B 71/06* (2006.01)
*A63B 71/04* (2006.01)
*A63B 69/40* (2006.01)

(52) U.S. Cl.
CPC .............. *A63B 69/40* (2013.01); *A63B 71/04* (2013.01); *A63B 71/06* (2013.01); *A63B 2069/0006* (2013.01); *A63B 2069/0008* (2013.01); *A63B 2069/401* (2013.01)

(56) References Cited

U.S. PATENT DOCUMENTS

| | | | | |
|---|---|---|---|---|
| 5,401,018 A | * | 3/1995 | Kelly | A63B 63/00 473/140 |
| 5,443,260 A | * | 8/1995 | Stewart | A63B 69/0002 473/421 |
| 5,897,445 A | * | 4/1999 | Sanders | A63B 24/0003 473/421 |
| 6,159,113 A | * | 12/2000 | Barber | A63B 69/0013 473/152 |
| 6,605,011 B1 | * | 8/2003 | Yamamoto | A63B 69/0002 473/455 |
| 6,820,605 B1 | * | 11/2004 | Suba | A63B 69/408 124/34 |
| 2002/0174859 A1 | * | 11/2002 | Suba | A63B 69/0002 124/78 |
| 2003/0040381 A1 | * | 2/2003 | Richings | A63B 69/406 473/415 |
| 2008/0300071 A1 | * | 12/2008 | Valaika | A63B 71/0669 473/422 |
| 2009/0182691 A1 | * | 7/2009 | Khaderi | A61B 3/024 706/12 |
| 2012/0142421 A1 | * | 6/2012 | Kennedy, Jr. | A63F 13/65 463/39 |

FOREIGN PATENT DOCUMENTS

| | | |
|---|---|---|
| KR | 10-2011-0065631 A | 6/2011 |
| KR | 10-1170147 B1 | 7/2012 |
| KR | 10-2013-0001871 A | 1/2013 |
| KR | 10-2014-0100685 A | 8/2014 |
| KR | 10-1494204 B1 | 2/2015 |
| KR | 10-2015-0127531 A | 11/2015 |
| KR | 10-2017-0073090 A | 6/2017 |

* cited by examiner

SCREEN BASEBALL SYSTEM AND METHOD OF REALIZING LEFT-HANDED PITCHER AND RIGHT-HANDED PITCHER USING THE SAME

TECHNICAL FIELD

The present invention relates to a so-called screen baseball system that enables a user to hit a ball pitched by a ball pitching device with a bat in an indoor space of a predetermined size and that enables a sensing device to sense the hit ball and to realize a simulation image on a front screen, and more particularly to a screen baseball system configured such that, in the case in which a virtual pitcher appearing in an image is a left-handed pitcher and in the case in which a virtual pitcher appearing in an image is a right-handed pitcher, a user who hits a ball is capable of experiencing pitch in each case, and a method of realizing a left-handed pitcher and a right-handed pitcher using the same.

BACKGROUND ART

With the recent increase in the number of people enjoying baseball, a so-called screen baseball system has emerged, which overcomes the limitations of playing baseball in a large baseball stadium and allows people to enjoy playing a virtual baseball game even in a small indoor space while experiencing virtual reality.

Typically, a screen baseball system is installed in an indoor space and has a batting area with a space of a predetermined size in which a user can bat and a screen capable of displaying a virtual baseball stadium. When a pitching machine installed behind the screen pitches a ball toward the batting area, a user who is ready to hit the ball in the batting area hits the ball pitched by the pitching machine. At this time, a sensing device senses the motion of the pitched ball and the motion of the ball hit by the user. Subsequently, based on the result of sensing, whether the pitched ball is a strike or a ball is determined, and an image simulating the trajectory of the hit ball is realized on the screen.

In the screen baseball system, a hole is formed in the screen on which a baseball simulation image is projected, and the pitching machine installed behind the screen pitches a ball toward the batting area through the hole formed in the screen.

Examples of such a screen baseball system using a pitching machine are disclosed in a considerably large number of related art documents, such as Korean Patent Application No. 10-2013-0013688, Korean Patent Application No. 10-2014-0058124, Korean Patent Application No. 10-2010-0079368, Korean Patent Application No. P1990-7002659, Japanese Patent Application Publication No. H09-276467, and Korean Patent Application No. P1994-0023057.

In most conventional screen baseball systems, including the above-described related art documents, a hole having sufficient size to allow a baseball to pass therethrough is formed in the screen, and the pitching machine installed behind the screen pitches a ball toward the batting area through the hole formed in the screen. As a result, when an image is projected on the screen, the image is not displayed on the hole, through which the baseball passes, but rather, the pitching machine is exposed through the hole. Consequently, the user's immersion in the image projected on the screen is greatly deteriorated, and the user's interest in the screen baseball game is greatly reduced.

Technology capable of controlling the hole in the screen so as to be open and closed such that the hole in the screen is open only when the pitching machine pitches a ball and such that the hole in the screen is closed when the pitching machine pitches no ball, whereby the image projected on the screen is completely visible rather than being partially omitted in order to prevent deterioration of user's immersion in screen baseball games through the image projected on the screen, has been filed in the name of the present applicant and has been accorded Korean Patent Application No. 10-2015-0181552.

The related art documents, including Korean Patent Application No. 10-2013-0013688, disclose technology in which, in order to realize various release points based on a pitching operation of a virtual pitcher on the image projected on the screen, a plurality of pitching holes, through which balls are pitched for the respective release points, is formed in the screen and in which, when a ball is to be pitched through a certain release point, the pitching machine installed behind the screen is moved upwards, downwards, leftwards, and rightwards such that the ball is pitched through a pitching hole corresponding to the certain release point.

In general, however, the pitching machine has quite large volume and weight. For this reason, an additional high-power driving device is required in order to move the pitching machine upwards, downwards, leftwards, and rightwards. In addition, it is very difficult to control the pitching machine so as to be accurately positioned behind the respective pitching holes in the screen. Above all, since a plurality of holes is formed in the screen, the entire image projected on the screen is not visible, user's immersion in the image is greatly deteriorated, and user's interest in screen baseball games is seriously reduced.

Also, even in the case in which the construction of opening and closing the hole in the screen disclosed in Korean Patent Application No. 10-2015-0181552, filed in the name of the present applicant, is applied to a plurality of holes in the screen, a plurality of additional driving motors must be provided, whereby the screen baseball system is complicated, cost is greatly increased, and the possibility of malfunction or breakdown of the screen baseball system is greatly increased. Above all, in the case in which a plurality of opening and closing structures is provided, the aesthetic appearance of the screen baseball system that is visible to users is greatly spoiled.

DISCLOSURE

Technical Problem

It is an object of the present invention to provide a screen baseball system, in which a pitching machine installed behind a screen pitches a ball toward a batting area through a pitching hole formed in the screen and a user hits the ball in the batting area, configured such that the case in which a virtual pitcher in an image projected on the screen is a left-handed pitcher and the case in which the virtual pitcher is a right-handed pitcher are realized when a ball is pitched through a single pitching hole, whereby the user who hits the ball in the batting area is capable of experiencing the pitch from the left-handed pitcher and the pitch from the right-handed pitcher, and a method of realizing a left-handed pitcher and a right-handed pitcher using the same.

Technical Solution

In accordance with an aspect of the present invention, the above and other objects can be accomplished by the provision of a screen baseball system including a screen installed in front of a batting area, the screen being provided therein with a pitching hole, through which a pitched ball passes, a ball pitching device installed behind the screen for pitching a ball toward the batting area through the pitching hole, an image realizer for realizing an image of a virtual pitcher pitching a ball to be projected on the screen, a batting area unit for displaying the batting area such that a user hits the ball pitched by the ball pitching device, and a batting area position controller for performing control such that the position of the batting area is changed depending on whether the virtual pitcher is a left-handed pitcher or a right-handed pitcher.

In accordance with another aspect of the present invention, there is provided a method of realizing a left-handed pitcher and a right-handed pitcher using a screen baseball system including a screen installed in front of a batting area, the screen being provided therein with a pitching hole, through which a pitched ball passes, a ball pitching device installed behind the screen for pitching a ball toward the batting area through the pitching hole, and an image realizer for realizing an image of a virtual pitcher pitching a ball to be projected on the screen, the method including determining whether the virtual pitcher in the image projected on the screen is a left-handed pitcher or a right-handed pitcher and changing the position of the batting area such that the batting area is located on the left side or the right side of a virtual center line extending from the pitching hole depending on the result of determination as to whether the virtual pitcher is a left-handed pitcher or a right-handed pitcher.

Advantageous Effects

A screen baseball system according to the present invention and a method of realizing a left-handed pitcher and a right-handed pitcher using the same have the following effects. The screen baseball system, in which a pitching machine installed behind a screen pitches a ball toward a batting area through a pitching hole formed in the screen and a user hits the ball in the batting area, is configured such that the case in which a virtual pitcher in an image projected on the screen is a left-handed pitcher and the case in which the virtual pitcher is a right-handed pitcher are realized when a ball is pitched through a single pitching hole, whereby the user who hits the ball in the batting area is capable of experiencing the pitch from the left-handed pitcher and the pitch from the right-handed pitcher. Consequently, it is possible to enable a user to play a screen baseball game with improved realism while feeling as if an actual baseball game were being played and to take more interest in the screen baseball game.

BEST MODE

A screen baseball system according to the present invention and a method of realizing a left-handed pitcher and a right-handed pitcher using the same will be described in detail with reference to the accompanying drawings.

Figure 1:
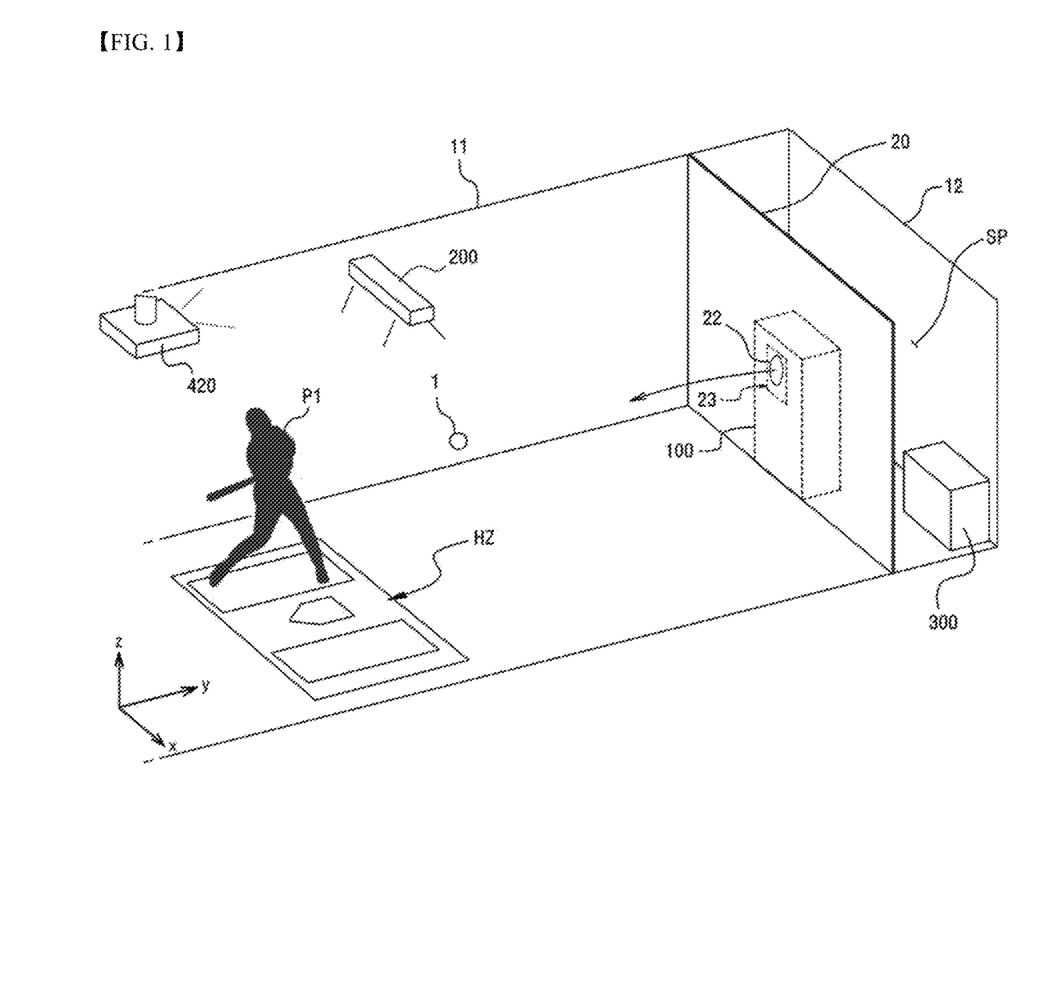
FIG. 1 is a view showing an example in which a screen baseball system according to an embodiment of the present invention is realized.

First, a screen baseball system according to an embodiment of the present invention will be described with reference to FIG. 1. FIG. 1 is a view showing an example in which a screen baseball system according to an embodiment of the present invention is realized.

In the same manner as a typical screen baseball system, as shown in FIG. 1, a screen baseball system according to an embodiment of the present invention includes a batting area HZ and a screen 20, which are provided in a space defined by a side wall 11 and a rear wall 12, and is configured such that a user P1 can swing and hit a ball with a bat in the batting area HZ.

In the space SP between the screen 20 and the rear wall 12 is provided an image realizer 300 for processing information about a baseball simulation image to be projected on the screen 20 (the image processed by the image realizer 300 is projected on the screen 20 through an image output device 420), and is installed a ball pitching device 100 that is capable of pitching a ball 1 toward the batting area HZ. A pitching hole 22 is formed in the screen 20 at a position corresponding to the portion of the ball pitching device 100 from which the ball is pitched such that the ball 1 can pass though the pitching hole 22.

The screen baseball system according to the embodiment of the present invention may include a hole shutter 23 for opening and closing the pitching hole 22 in the screen 20.

In addition, a sensing device 200 is installed to sense the ball pitched by the ball pitching device 100 and the ball hit by the user in the batting area HZ.

Hereinafter, components constituting the screen baseball system according to the embodiment of the present invention shown in FIG. 1 will be described with reference to FIG. 2.

Figure 2:
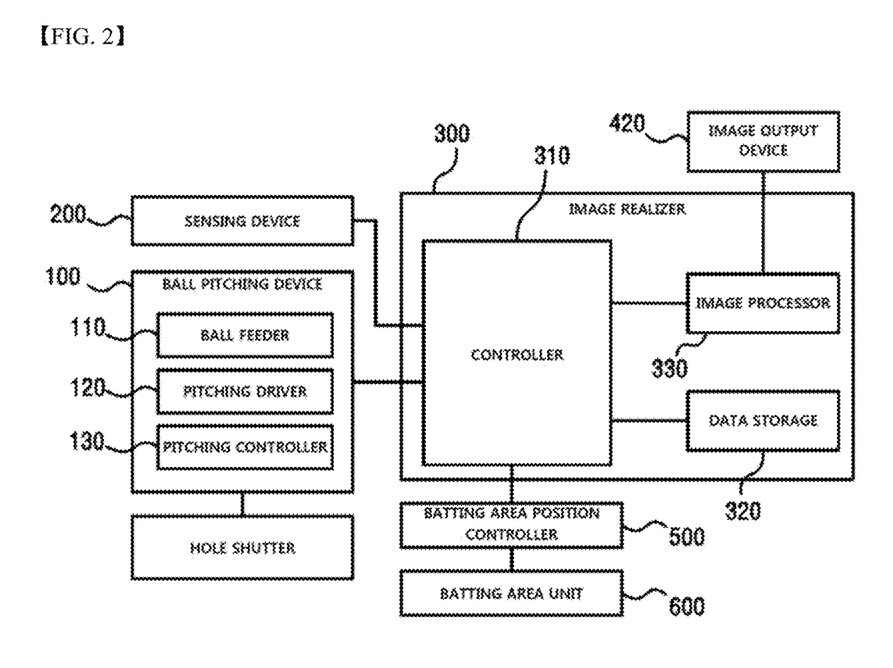
FIG. 2 is a block diagram showing main components of the screen baseball system shown in FIG. 1.

As shown in FIG. 2, the screen baseball system according to the embodiment of the present invention may include a ball pitching device 100, a sensing device 200, an image realizer 300, an image output device 420, a batting area position controller 500, and a batting area unit 600.

As shown in FIGS. 1 and 2, the image realizer 300 may include a data storage 320, an image processor 330, and a controller 310, and the image output device 420 may be realized by a projection device that projects the image processed by the image processor 330 on the screen 20.

The data storage 320 is a unit that stores data for processing simulation images of a baseball game played in the screen baseball system, such as an image simulating the background, an image simulating a virtual player, and an image simulating a hit ball. The data storage 320 may be configured to serve as a storage space for temporarily storing data received from a server (not shown).

The image processor 330 generates various kinds of baseball-simulation-related images including a background image such as an image of a virtual baseball stadium and images of players, umpires, spectators, and the like, an image of a virtual pitcher pitching a ball, and an image simulating the trajectory of a ball hit by the user. The generated images are transmitted to the image output device 420 so as to be projected on the screen 20.

Meanwhile, the sensing device 200 may be realized by infrared sensors arranged in a matrix form, which may be installed along the path along which the ball pitched by the user passes in order to sense information about the speed of the ball pitched by the user and the trajectory of the pitched ball, or may be realized by pressure sensors, which may be installed behind the screen in order to sense the position of the ball pitched by the user based on the sensed pressure at which the ball reaches a certain portion of the strike zone.

However, there are limitations in acquiring accurate information about the motion of the pitched ball using the infrared sensors or the pressure sensors, and in the case in which the sensors are installed at the screen, the sensors may be damaged, which is undesirable.

In the screen baseball system according to the embodiment of the present invention, the sensing device is realized by a camera sensing type sensing device, which continuously captures images of the ball pitched by the user and analyzes the captured images in order to accurately sense information about the motion of the pitched ball and the position of the strike zone displayed in the image projected on the screen where the pitched ball reaches.

The technology applied to the sensing device is disclosed in Korean Patent Application No. 10-2016-0004526, filed in the name of the present applicant.

Meanwhile, the ball pitching device 100 is a pitching machine installed behind the screen 20 for pitching a ball through the pitching hole 22 in the screen 20. As shown in FIG. 2, the ball pitching device 100 may include a ball feeder 110, a pitching driver 120, and a pitching controller 130.

The ball feeder 110 is a component that feeds balls one by one from a storage box in which a plurality of balls is stored to the pitching driver 120, i.e. to a position for pitching.

The pitching driver 120 is a component for pitching a ball fed by the ball feeder 110. The pitching-driving unit 120 may be realized in various ways. For example, the pitching driver 120 may be realized so as to rotate a wheel and pitch a ball placed between the wheel and a guide plate using the rotational force of the wheel (e.g. Japanese Patent Application Publication No. 2014-217468), may be realized so as to rotate two or more wheels, to locate a ball between the wheels, and to pitch the ball using the rotational force of the wheels (e.g. Korean Patent Application Publication No. 2014-0100685, Korean Registered Patent No. 0411754, and Korean Registered Utility Model No. 0269859), or may be realized so as to pitch a ball by rotating an arm holding the ball (e.g. Korean Registered Patent No. 0919371).

The pitching controller 130 may control the pitching driver 120 based on predetermined pitching conditions, pitching conditions set according to predetermined artificial intelligence (AI) for virtual player characters in a game, or pitching conditions input by another user through the manipulation of his/her terminal when the initial user hits a ball such that the speed or pitch of the ball is controlled under the pitching conditions, whereby ball pitching is achieved.

In addition, the pitching driver 120 of the ball pitching device 100 may be configured to be tilted in the upward-downward direction and in the leftward-rightward direction. The pitching controller 130 controls the operation of tilting the pitching driver 120 based on the pitching conditions such that the ball can be pitched in various directions within a predetermined angular range through the pitching hole in the screen.

Concrete configurations of the ball pitching device 100 have already been disclosed in various related art documents, and therefore a detailed description thereof will be omitted.

Here, as shown in FIG. 1, the hole shutter 23 is a component for opening and closing the pitching hole 22 in the screen 20 using an opening and closing member. The hole shutter 23 opens the pitching hole 22 only for a short period of time, during which a virtual pitcher pitches a ball in an image on the screen 20, and closes the pitching hole 22 after the completion of pitching such that an image projected on the screen may be naturally seen without a portion thereof being omitted at the position of the pitching hole.

Meanwhile, the controller 310 controls respective components of the screen baseball system according to the embodiment of the present invention, and performs various calculations for realizing a baseball simulation image.

In particular, the controller 310 transmits information about whether, when a virtual pitcher appears in an image output by the image processor 330 and the image output device 420, the virtual pitcher is a left-handed pitcher or a right-handed pitcher to the batting area position controller 500. The batting area position controller 500 controls the batting area unit 600 based on the received information such that the user can hit the ball pitched by the left-handed pitcher in the batting area or can hit the ball pitched by the right-handed pitcher in the batting area, a detailed description of which will follow.

Meanwhile, as shown in FIG. 1, the screen baseball system according to the embodiment of the present invention is configured such that the user P1 can hit the ball 1 pitched by the ball pitching device 100 in the batting area HZ. Ball pitching is performed by the ball pitching device 100 based on an image of a virtual pitcher pitching a ball. This may be performed based on predetermined artificial intelligence (AI) for the virtual pitcher (artificial intelligence for game characters) or may be performed based on pitching conditions set by another user through the manipulation of his/her terminal, such as the speed, direction, and pitch of a ball to be pitched.

In addition, a system realized by interconnecting the screen baseball system according to the present invention and another screen baseball system via a predetermined server over a network may be configured such that a user (for the sake of convenience, referred to as a "first user") pitches a ball in the screen baseball system according to the present invention (for the sake of convenience, referred to as a "first apparatus") and a user (for the sake of convenience, referred to as a "second user") hits the ball in another screen baseball system (for the sake of convenience, referred to as a "second apparatus"), i.e. the users play offensive and defensive positions through different apparatuses. When the first user pitches a ball in the first apparatus, the ball pitching device pitches a ball toward the batting area in the second apparatus. When the second user hits the pitched ball in the second apparatus, a virtual batter VB in an image IM hits a virtual ball in the first apparatus.

Figure 3:
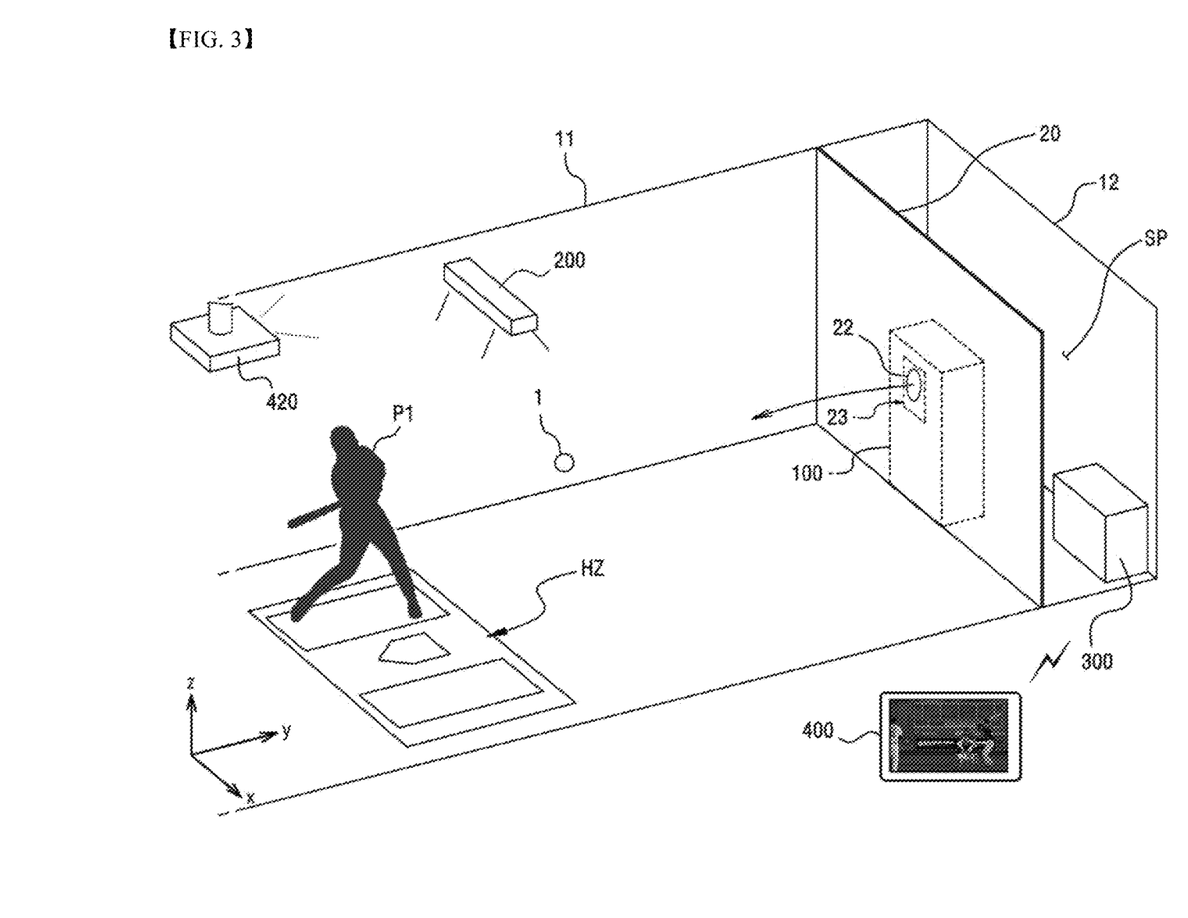
FIGS. 3 and 4 are views showing screen baseball systems according to other embodiments of the present invention.

FIG. 3 shows the case in which, when the user is ready to hit a ball in the batting area HZ, a virtual pitcher pitches a ball based on pitching conditions input by another user through the manipulation of his/her terminal, whereby the ball pitching device 100 pitches a ball 1 toward the batting area HZ.

The screen baseball system shown in FIG. 3 is identical to the screen baseball system shown in FIG. 1, and therefore a detailed description thereof will be omitted.

In this embodiment, as shown in FIG. 3, another user, who is different from the user P1 who hits a ball, manipulates a terminal 400 configured to communicate with the image realizer 300 in a wired or wireless fashion in order to control pitching conditions of a virtual pitcher and the ball pitching device 100 in an image.

Figure 4:
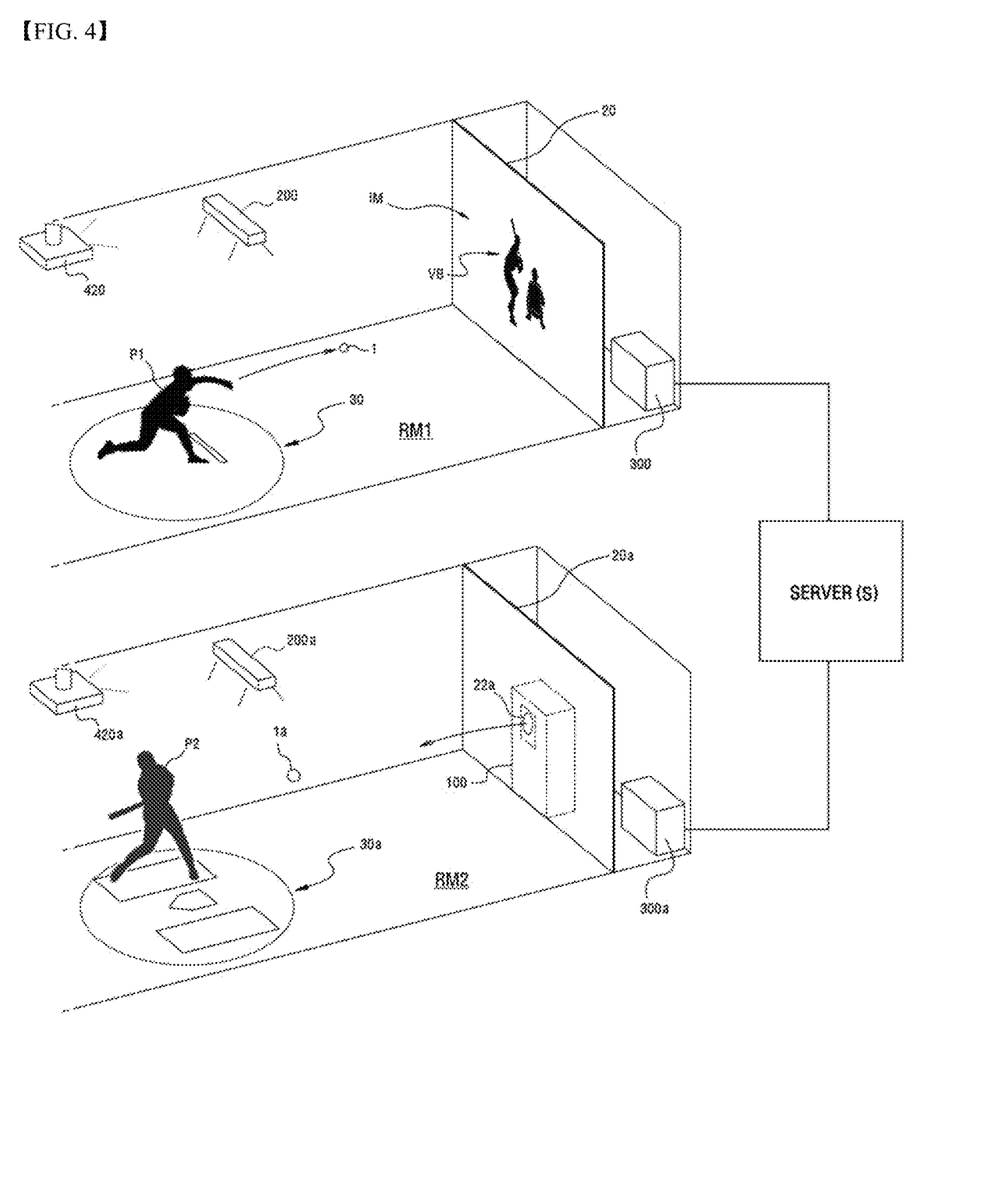

Meanwhile, FIG. 4 shows the case in which, when the first apparatus and the second apparatus perform offensive and defensive roles, respectively, the first user pitches a ball in the first apparatus, the second user hits the ball, swings and misses, or does not swing in the second apparatus, and a virtual batter in an image takes the same action in the first apparatus.

In FIG. 4, RM1 indicates a play space in which the first user P1 on a mound 30 pitches a ball 1 toward a virtual batter VB in an image IM using the first apparatus in order to play a baseball game, and RM2 indicates a play space in which the second user P2 in a batting area 30a hits a ball 1a pitched by the ball pitching device 100 using the second apparatus in order to play a baseball game.

The first apparatus in RM1 has the same construction as the screen baseball system according to the embodiment of the present invention shown in FIG. 1, and the second apparatus in RM2 includes a sensing device 200a and an image realizer 300a, which are identical to those of the first apparatus. The second apparatus includes a ball pitching device 100 installed behind a screen 20a, and a pitching hole 22a is formed in the screen 20a such that the ball pitching device 100 pitches the ball 1a toward the batting area 30a through the pitching hole 22a.

Although not clearly shown in the figure, the first apparatus may include a ball pitching device and a pitching hole that are identical to those of the second apparatus.

That is, the first apparatus in RM1 and the second apparatus in RM2 may have the same construction such that both offense and defense are possible using each of the apparatuses.

As shown in FIG. 4, the image realizer 300 of the first apparatus and the image realizer 300a of the second apparatus may be connected to a server S so as to transmit and receive data to and from each other via the server S.

When the first user P1 pitches a ball 1 in the first apparatus, therefore, the sensing device 200 senses the pitched ball and calculates sensing information. The image realizer 300 transmits the calculated sensing information to the server S.

The server S transmits the sensing information, received from the image realizer of the first apparatus, to the image realizer 300a of the second apparatus. The image realizer 300a controls the ball pitching device 100 to pitch a ball corresponding to the received sensing information.

When the ball pitching device 100 pitches a ball 1a in response to the pitching of the first user P1 in the second apparatus, the second user P2 may hit the ball, may swing and miss, or may not swing. The sensing device 200a senses the action of the second user and transmits sensing information to the image realizer 300a. The image realizer 300a transmits the sensing information to the server S.

The server S transmits the sensing information to the image realizer 300 of the first apparatus. The image realizer 300 of the first apparatus performs an image realization operation such that a virtual batter VB in an image IM hits a virtual ball, swings and misses, or does not swing based on the sensing information received from the server S.

In this way, the first user P1 who plays in RM1 and the second user P2 who plays in RM2 may play offensive and defensive positions, respectively, enjoying an experience-oriented virtual baseball game as if an actual baseball game were being played.

The first user P1, who plays in RM1, may be a left-handed pitcher or a right-handed pitcher. Whether the first user P1 is a left-handed pitcher or a right-handed pitcher may be selected and preset, or may be determined by analyzing pitching of the first user P1 using the sensing device 200. Information about whether the first user P1 is a left-handed pitcher or a right-handed pitcher is transmitted to the server S via the image realizer 300.

The server S transmits the information about whether the first user P1 is a left-handed pitcher or a right-handed pitcher to the image realizer 300a of the second apparatus. The image realizer 300a realizes an image of the left-handed pitcher or the right-handed pitcher in an image, and realizes an image of a batting area corresponding to the left-handed pitcher or a batting area corresponding to the right-handed pitcher by changing the position of the batting area. The ball pitching device 100 pitches a ball corresponding to the pitching of the first user P1 within a predetermined pitching range for the left-handed pitcher or the right-handed pitcher.

In this way, play corresponding to the left-handed pitcher or the right-handed pitcher is possible in RM2.

Figure 5:
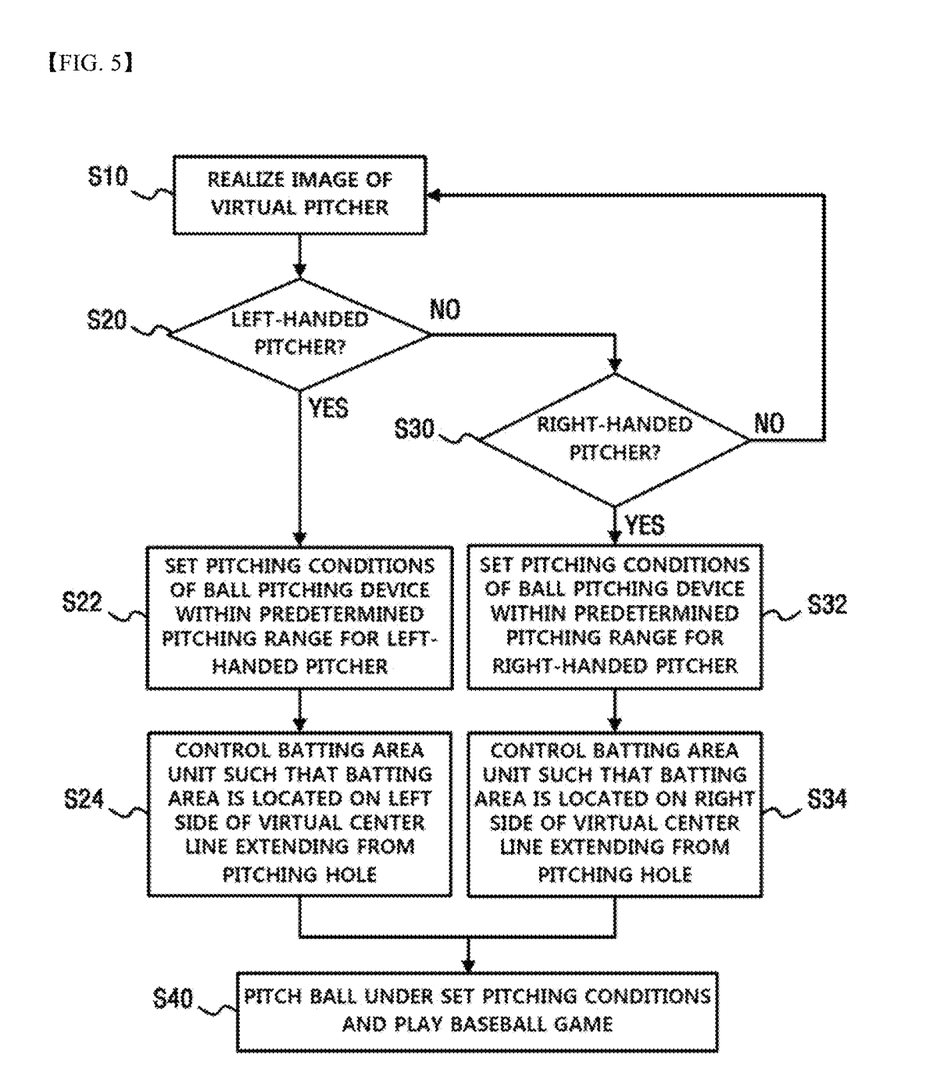
FIG. 5 is a flowchart showing a method of realizing a left-handed pitcher and a right-handed pitcher using the screen baseball system according to the embodiment of the present invention.

Hereinafter, a method of realizing a left-handed pitcher and a right-handed pitcher using the screen baseball system according to the embodiment of the present invention will be described in detail with reference to the flowchart shown in FIG. 5.

An image of a virtual pitcher is realized in an image (S10), and the batting area position controller 500 (see FIG. 2) receives information about whether the virtual pitcher is a left-handed pitcher or a right-handed pitcher from the controller 310 (see FIG. 2) of the image realizer 300.

In the case in which the virtual pitcher is a left-handed pitcher (S20), the pitching controller of the ball pitching device sets pitching conditions of the ball pitching device within a predetermined pitching range for a left-handed pitcher (S22), and the batting area position controller controls the batting area unit such that the batting area is located on the left side of a virtual center line extending from the pitching hole (S24).

Figure 6:
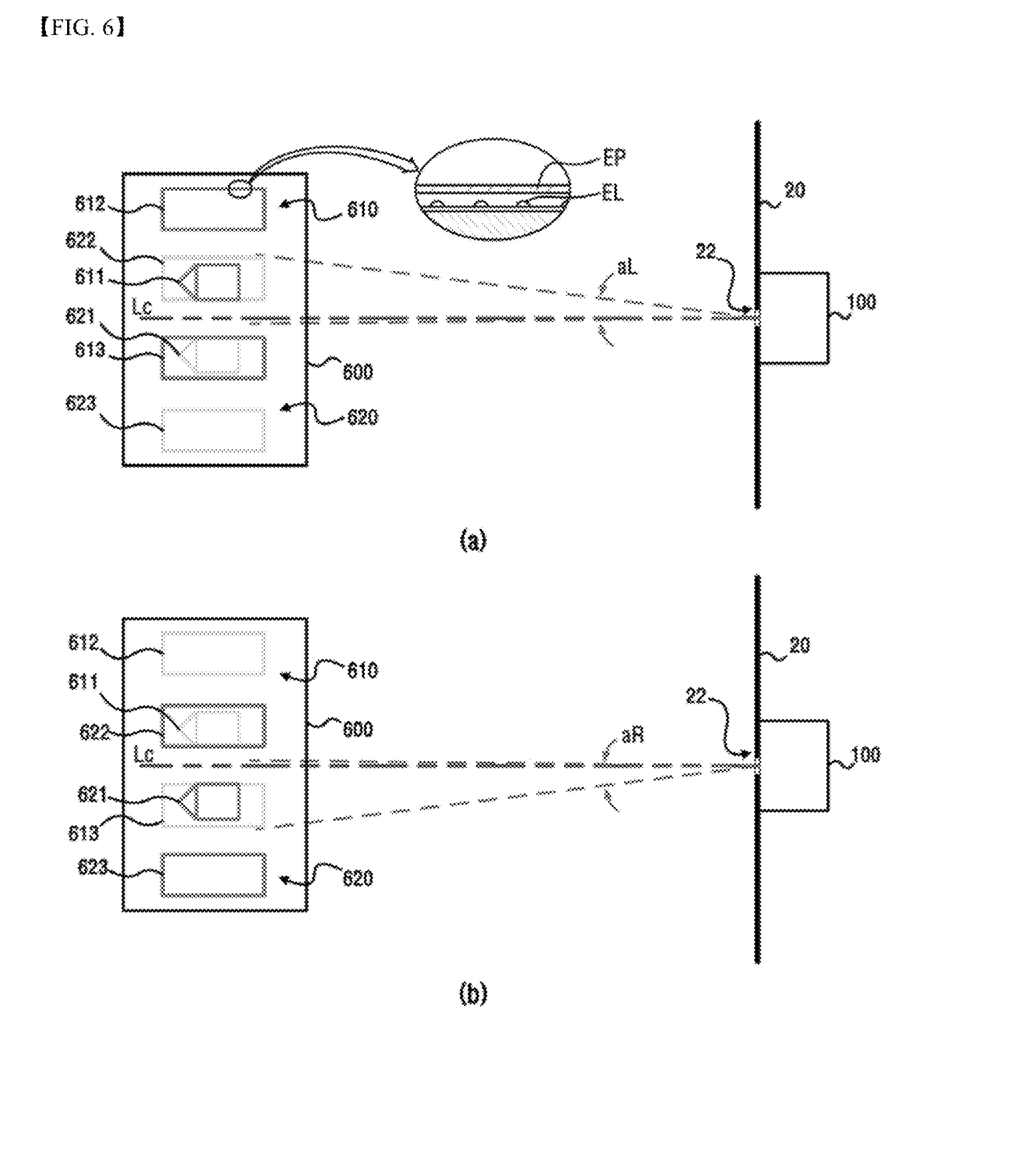
FIGS. 6 to 8 are views illustrating various embodiments of the screen baseball system according to the present invention and the method of realizing the left-handed pitcher/the right-handed pitcher using the same.

Concrete examples of step S24 are shown in FIGS. 6(*a*), 7(*a*), and 8(*a*).

In the case in which the virtual pitcher is a right-handed pitcher (S30), the pitching controller of the ball pitching device sets pitching conditions of the ball pitching device within a predetermined pitching range for a right-handed pitcher (S32), and the batting area position controller controls the batting area unit such that the batting area is located on the right side of the virtual center line extending from the pitching hole (S34).

Concrete examples of step S34 are shown in FIGS. 6(*b*), 7(*b*), and 8(*b*).

Hereinafter, various examples in which, in the respective cases in which a virtual pitcher in an image is a left-handed pitcher or a right-handed pitcher, the position of the batting area is changed so as to correspond to the left-handed pitcher or the right-handed pitcher will be described with reference to FIGS. 6 to 8.

FIGS. 6(*a*), 7(*a*), and 8(*a*) show the case in which, when a left-handed pitcher appears in an image, the batting area is located on the left side of a virtual center line Lc extending from the pitching hole and in which the ball pitching device 100 pitches a ball within an angular range preset as a pitching angular range aL biased to the left side from the virtual center line Lc.

FIGS. 6(b), 7(b), and 8(b) show the case in which, when a right-handed pitcher appears in an image, the batting area is located on the right side of the virtual center line extending from the pitching hole and in which the ball pitching device pitches a ball within an angular range preset as a pitching angular range aR biased to the right side from the virtual center line.

FIGS. 6(a) and 6(b) show the case in which the batting area unit 600 is displayed by a plurality of light emitting diodes (both the case in which a plurality of point light sources, such as LEDs, is disposed and the case in which a surface light source realized using a plurality of LEDs is used may be included).

The batting area unit 600 shown in FIGS. 6(a) and 6(b) includes a first batting area display unit 610 having a batting area formed in the state in which the center thereof (the center of a home plate 611) is located on the left side of the virtual center line Lc extending from the pitching hole 22 of the screen 20 and a second batting area display unit 620 having a batting area formed in the state in which the center thereof (the center of a home plate 621) is located on the right side of the virtual center line Lc.

As shown in FIG. 6(a) as a side sectional view, each of the first batting area display unit 610 and the second batting area display unit 620 may include a light transmission member EP for displaying a batting area and a plurality of light emitting devices EL installed under the light transmission member EP so as to be arranged at predetermined intervals.

As shown in FIGS. 6(a) and 6(b), the first batting area display unit 610 includes a first home plate 611, a first left-handed batter's box 612, and a first right-handed batter's box 613, and the second batting area display unit 620 includes a second home plate 621, a second left-handed batter's box 622, and a second right-handed batter's box 623.

Upon determining that a virtual left-handed pitcher appears in the image, as shown in FIG. 6(a), the batting area position controller 500 (see FIG. 2) turns on the light emitting devices of the first batting area display unit 610 and turns off the light emitting devices of the second batting area display unit 620 such that the center of the home plate in the batting area that a user is to enter is located to the left of the virtual center line Lc by a predetermined distance. At this time, the ball pitching device 100 is set to pitch a ball within an angular range preset as a pitching angular range aL biased to the left side from the virtual center line Lc.

In this state, a left-handed user may hit a ball in the first left-handed batter's box 612, or a right-handed user may hit a ball in the first right-handed batter's box 613. The ball pitching device 100 may pitch a ball through the pitching hole 22 under pitching conditions set within the predetermined pitching angular range aL, and the user may hit the ball pitched by the left-handed pitcher.

In addition, upon determining that a virtual right-handed pitcher appears in the image, as shown in FIG. 6(b), the batting area position controller 500 turns on the light emitting devices of the second batting area display unit 620 and turns off the light emitting devices of the first batting area display unit 610 such that the center of the home plate in the batting area that a user is to enter is located to the right of the virtual center line Lc by a predetermined distance. At this time, the ball pitching device 100 is set to pitch a ball within an angular range preset as a pitching angular range aR biased to the right side from the virtual center line Lc.

In this state, a left-handed user may hit a ball in the second left-handed batter's box 622, or a right-handed user may hit a ball in the second right-handed batter's box 623. The ball pitching device 100 may pitch a ball through the pitching hole 22 under pitching conditions set within the predetermined pitching angular range aR, and the user may hit the ball pitched by the right-handed pitcher.

The ball pitching of the ball pitching device 100 is determined based on pitching conditions that are set. The pitching conditions may be set according to preprogrammed artificial intelligence (AI) for virtual pitcher characters, may be determined by another user's terminal manipulation, or may be determined by the result of sensing of the sensing device that senses the pitching of a user who pitches a ball in another screen baseball system. In the case in which a user performs a hitting practice alone, the pitching conditions may be set according to criteria preset by the user who performs the hitting practice or according to criteria preset by the screen baseball system such that the user performs the hitting practice.

The setting of the pitching conditions described above may be limited depending on whether a left-handed pitcher is realized or a right-handed pitcher is realized.

That is, in the case in which, as a left-handed pitcher appears in the image, as shown in FIG. 6(a), the batting area position is changed, and the pitching angular range of the ball pitching device 100 is set to the pitching angular range aL, the pitching conditions described above may be set within the pitching angular range aL.

Also, in the case in which, as a right-handed pitcher appears in the image, as shown in FIG. 6(b), the batting area position is changed, and the pitching angular range of the ball pitching device 100 is set to the pitching angular range aR, the pitching conditions described above may be set within the pitching angular range aR.

The setting of the pitching conditions described above may be equally applied to all embodiments that will be described hereinafter.

Meanwhile, the realization of a left-handed pitcher and a right-handed pitcher based on the change of the batting area position and the setting of the ball pitching range will be additionally described.

In an actual baseball game, a pitcher on a mound looks at a batting area along a virtual extension line extending from the center of a home plate in the batting area. In the case in which a left-handed pitcher pitches a ball toward the batting area in this state, the pitched ball moves toward the home plate obliquely from the right side to the left side when looking at the pitcher from the home plate (for a left-handed batter, an inside ball pitched by a left-handed pitcher moves toward the home plate from the right side to the left side in a high oblique fashion, and an outside ball pitched by the left-handed pitcher moves toward the home plate from the right side to the left side in a low oblique fashion).

For a right-handed pitcher, the pitched ball moves toward the home plate obliquely from the left side to the right side when looking at the pitcher from the home plate, in the same manner as for the left-handed pitcher.

Referring to FIG. 6(a), which shows the case of a left-handed pitcher, the center of the home plate is biased to the left side from the virtual center line Lc (when looking at the screen 20), and therefore the pitching hole 22 is located on the right side when looking from the center of the home plate. When a ball is pitched through the pitching hole 22 within the pitching angular range aL in this state, the pitched ball moves toward the home plate obliquely from the right side to the left side when looking from the batting area. Consequently, a user in the batting area may feel as if a left-handed pitcher pitched a ball.

This is equally applied to the embodiments shown in FIGS. 7(*a*) and 8(*a*), which will be described below.

In the same manner, referring to FIG. 6(*b*), which realizes a right-handed pitcher, the center of the home plate is biased to the right side from the virtual center line Lc (when looking at the screen 20), and therefore the pitching hole 22 is located on the left side when looking from the center of the home plate. When a ball is pitched through the pitching hole 22 within the pitching angular range aR in this state, the pitched ball moves toward home plate obliquely from the left side to the right side when looking from the batting area. Consequently, a user in the batting area may feel as if a right-handed pitcher pitched a ball.

This is equally applied to the embodiments shown in FIGS. 7(*b*) and 8(*b*), which will be described below.

Figure 7:
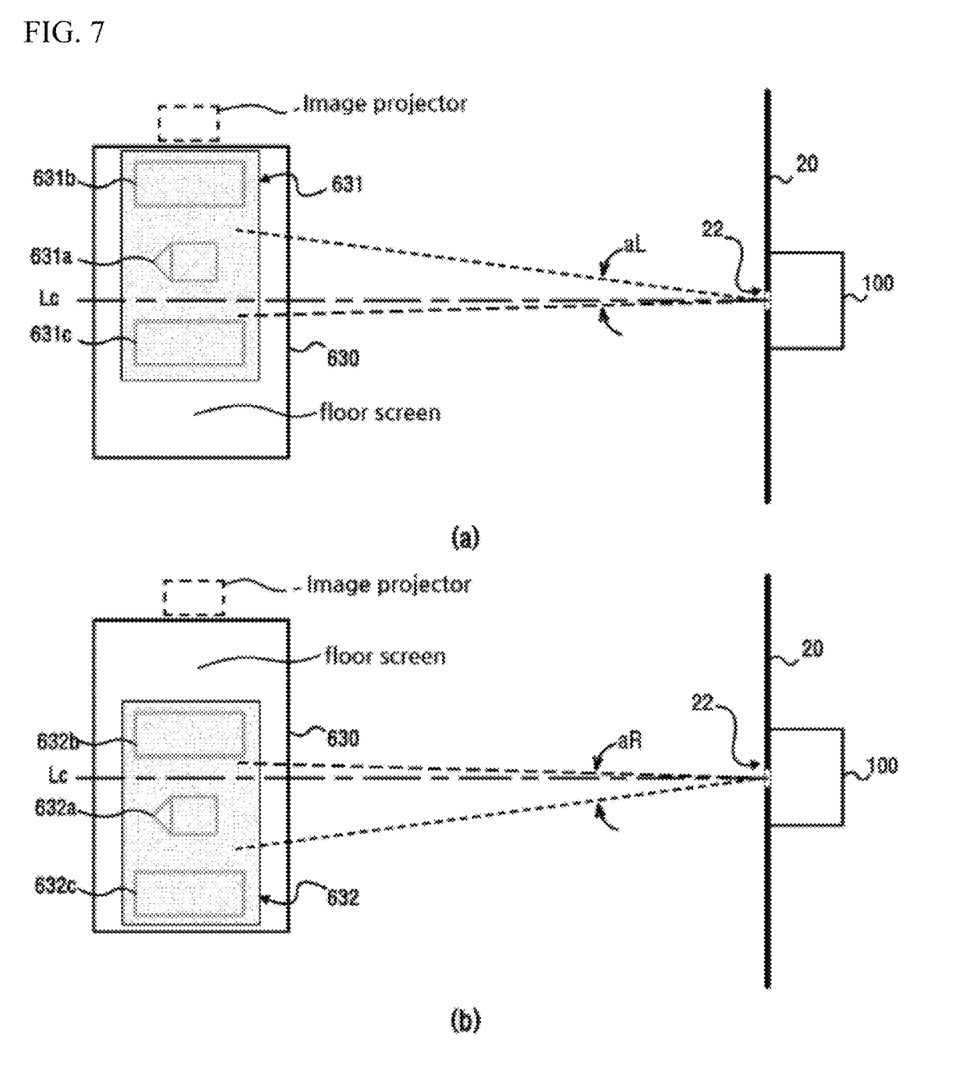

Meanwhile, FIGS. 7(*a*) and 7(*b*) show the case in which the batting area unit is realized by a floor display device 630 installed on a floor for displaying an image of a batting area on the top of the floor.

The floor display device 630 may be realized by a liquid crystal display (LCD), may be realized by a plasma display panel (PDP), or may be realized by a projection type display device including a floor screen installed on a floor and an image projector installed under the floor screen for projecting an image on the floor screen.

The floor display device 630 is configured to display one of a first batting area image part 631, having the center of a batting area located on the left side of a virtual center line Lc extending from the pitching hole 22, through which a ball is pitched (for the projection type display device, a first batting area image projection part) and a second batting area image part 632, having the center of the batting area located on the right side of the virtual center line Lc, through which a ball is pitched (for the projection type display device, a second batting area image projection part).

As shown in FIGS. 7(*a*) and 7(*b*), the first batting area image part 631 includes a first home plate part 631*a*, a first left-handed batter's box part 631*b*, and a first right-handed batter's box part 631*c*, and the second batting area image part 632 includes a second home plate part 632*a*, a second left-handed batter's box part 632*b*, and a second right-handed batter's box part 632*c*.

Upon determining that a virtual left-handed pitcher appears in the image, as shown in FIG. 7(*a*), the batting area position controller 500 (see FIG. 2) controls the floor display device 630 to display the first batting area image part 631 on the floor screen such that the center of the home plate in the batting area that a user is to enter is located to the left of the virtual center line Lc by a predetermined distance. At this time, the ball pitching device 100 is set to pitch a ball within an angular range preset as a pitching angular range aL biased to the left side from the virtual center line Lc.

In this state, a left-handed user may hit a ball in the first left-handed batter's box part 631*b* of the first batting area image part 631 displayed by the floor display device 630, or a right-handed user may hit a ball in the first right-handed batter's box part 631*c*. The ball pitching device 100 may pitch a ball through the pitching hole 22 under pitching conditions set within the predetermined pitching angular range aL, and the user may hit the ball pitched by the left-handed pitcher.

In addition, upon determining that a virtual right-handed pitcher appears in the image, as shown in FIG. 7(*b*), the batting area position controller 500 controls the floor display device 630 to display the second batting area image part 632 on the floor screen such that the center of the home plate in the batting area that a user is to enter is located to the right of the virtual center line Lc by a predetermined distance. At this time, the ball pitching device 100 is set to pitch a ball within an angular range preset as a pitching angular range aR biased to the right side from the virtual center line Lc.

In this state, a left-handed user may hit a ball in the second left-handed batter's box part 632*b* of the second batting area image part 632 displayed by the floor display device 630, or a right-handed user may hit a ball in the second right-handed batter's box part 632*c*. The ball pitching device 100 may pitch a ball through the pitching hole 22 under pitching conditions set within the predetermined pitching angular range aR, and the user may hit the ball pitched by the right-handed pitcher.

Figure 8:
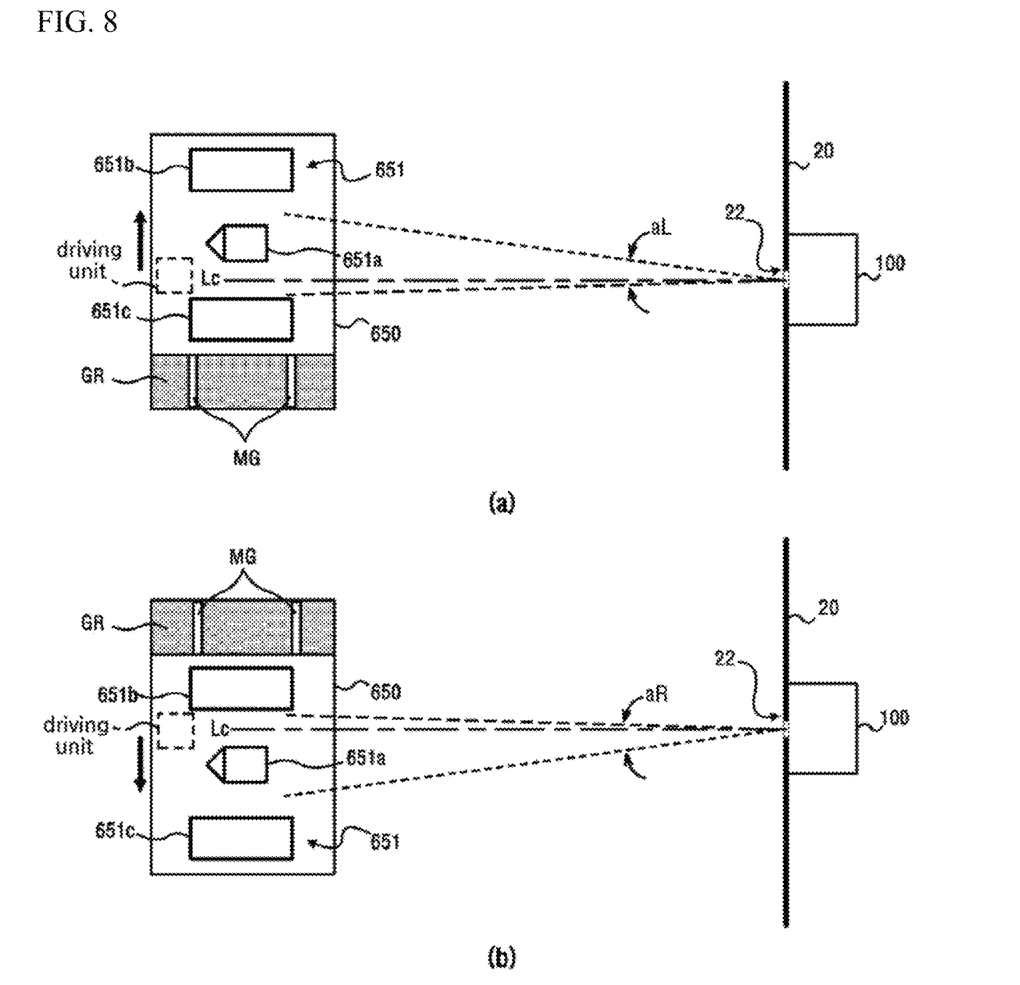

Meanwhile, FIGS. 8(*a*) and 8(*b*) show the case in which the batting area unit is realized by a batting area plate 650 having a batting area 651 displayed therein and in which the batting area plate 650 is movable leftwards and rightwards (in the directions indicated by the arrows shown in FIGS. 8(*a*) and 8(*b*)).

A guide unit MG is installed on a floor GR. Although not shown in the figures, the batting area position controller 500 (see FIG. 2) controls a driving unit (not shown) for moving the batting area plate 650 such that the batting area plate 650 is moved leftwards in order to realize a left-handed pitcher, as shown in FIG. 8(*a*), or is moved rightwards in order to realize a right-handed pitcher, as shown in FIG. 8(*b*).

The driving unit (not shown) may include a means for generating driving force, such as a motor, and a means for transmitting the generated driving force, such as a gear or a belt, and may move the batting area plate 650 along the guide unit MG in the directions indicated by the arrows shown in FIGS. 8(*a*) and 8(*b*).

The batting area 651, which includes a home plate 651*a*, a left-handed batter's box 651*b*, and a right-handed batter's box 651*c*, is displayed in the batting area plate 650.

Upon determining that a virtual left-handed pitcher appears in the image, as shown in FIG. 8(*a*), the batting area position controller 500 (see FIG. 2) controls the driving unit to move the batting area plate 650 leftwards such that the center of the home plate 651*a* of the batting area 651 is located to the left of the virtual center line Lc by a predetermined distance. At this time, the ball pitching device 100 is set to pitch a ball within an angular range preset as a pitching angular range aL biased to the left side from the virtual center line Lc.

In the state in which the batting area has been moved leftwards, a left-handed user may hit a ball in the left-handed batter's box 651*b*, or a right-handed user may hit a ball in the right-handed batter's box 651*c*. The ball pitching device 100 may pitch a ball through the pitching hole 22 under pitching conditions set within the predetermined pitching angular range aL, and the user may hit the ball pitched by the left-handed pitcher.

In addition, upon determining that a virtual right-handed pitcher appears in the image, as shown in FIG. 8(*b*), the batting area position controller 500 controls the driving unit to move the batting area plate 650 rightwards such that the center of the home plate 651*a* of the batting area 651 is located to the right of the virtual center line Lc by a predetermined distance. At this time, the ball pitching device 100 is set to pitch a ball within an angular range preset as a pitching angular range aR biased to the right side from the virtual center line Lc.

In the state in which the batting area has been moved rightwards, a left-handed user may hit a ball in the left-handed batter's box 651*b*, or a right-handed user may hit a ball in the right-handed batter's box 651*c*. The ball pitching device 100 may pitch a ball through the pitching hole 22 under pitching conditions set within the predetermined pitching angular range aR, and the user may hit the ball pitched by the right-handed pitcher.

As is apparent from the above description, the screen baseball system according to the present invention is configured such that the case in which a virtual pitcher in an image projected on the screen is a left-handed pitcher and the case in which the virtual pitcher is a right-handed pitcher are realized by changing the position of the batting area and setting the pitching range when a ball is pitched through a single pitching hole, whereby a user who hits a ball in the batting area is capable of experiencing pitch from a left-handed pitcher and pitch from a right-handed pitcher. Consequently, it is possible to enable the user to play a screen baseball game with improved realism while feeling as if an actual baseball game were being played and to take more interest in the screen baseball game.

INDUSTRIAL APPLICABILITY

The screen baseball system according to the embodiment of the present invention and the method of realizing the left-handed pitcher and the right-handed pitcher using the same are industrially applicable in a technical field that allows a user to practice baseball or to play a virtual baseball game in such a manner that the user pitches a ball toward a virtual batter realized as an image on a screen installed in front of the user in an indoor space of a predetermined size and in such a manner that the sensing device senses the pitched ball and realizes a simulation image on the screen.

The invention claimed is:

1. A screen baseball system comprising:
a screen installed in front of a batting area, the screen being provided therein with a pitching hole, through which a pitched ball passes;
a ball pitching device installed behind the screen for pitching a ball toward the batting area through the pitching hole;
an image realizer for realizing an image of a virtual pitcher pitching a ball to be projected on the screen;
a batting area unit for forming the batting area including a home plate, a left-handed batter's box and a right-handed batter's box such that a user hits the ball pitched by the ball pitching device; and
a batting area position controller for controlling to change a position of the batting area such that the batting area is located on a left side or a right side of a virtual center line extending from the pitching hole depending on a result of determination as to whether the virtual pitcher projected on the screen is a left-handed pitcher or a right-handed pitcher.

2. The screen baseball system according to claim 1, wherein the ball pitching device is configured to preset a ball pitching angular range in a case in which the virtual pitcher is a left-handed pitcher and a ball pitching angular range in a case in which the virtual pitcher is a right-handed pitcher.

3. The screen baseball system according to claim 1, wherein
the batting area unit comprises a first batting area display unit having a batting area formed in a state in which a center thereof is located on a left side of a virtual center line extending from the pitching hole and a second batting area display unit having a batting area formed in a state in which a center thereof is located on a right side of the virtual center line,
each of the first batting area display unit and the second batting area display unit is formed by arranging a plurality of light emitting devices at predetermined intervals, and
the batting area position controller performs control such that one of the light emitting devices of the first batting area display unit and the light emitting devices of the second batting area display unit is selectively turned on and the other of the light emitting devices of the first batting area display unit and the light emitting devices of the second batting area display unit is turned off depending on whether the virtual pitcher is a left-handed pitcher or a right-handed pitcher.

4. The screen baseball system according to claim 1, wherein
the batting area unit comprises a floor display device installed on a floor for displaying an image of the batting area on a top of the floor,
the floor display device is configured to display one of a first batting area image part having a center thereof located on a left side of a virtual center line extending from the pitching hole and a second batting area image part having a center thereof located on a right side of the virtual center line, and
the batting area position controller performs control such that one of the first batting area image part and the second batting area image part is selectively displayed by the floor display device depending on whether the virtual pitcher is a left-handed pitcher or a right-handed pitcher.

5. The screen baseball system according to claim 1, wherein
the batting area unit comprises a floor screen installed on a floor and an image projector installed under the floor screen for projecting an image on the floor screen,
the image projector is configured to project, on the floor screen, one of a first batting area image projection part having a center thereof located on a left side of a virtual center line extending from the pitching hole and a second batting area image projection part having a center thereof located on a right side of the virtual center line, and
the batting area position controller controls the image projector such that one of the first batting area image projection part and the second batting area image projection part is selectively displayed on the floor screen depending on whether the virtual pitcher is a left-handed pitcher or a right-handed pitcher.

6. The screen baseball system according to claim 1, wherein
the batting area unit comprises a batting area plate having the batting area displayed therein and a driving unit for providing driving force necessary to move the batting area plate leftwards and rightwards, and
the batting area position controller controls the driving unit such that a center of the batting area displayed in the batting area plate is located on a left side or a right side of a virtual center line extending from the pitching hole depending on whether the virtual pitcher is a left-handed pitcher or a right-handed pitcher in order to move the batting area plate leftwards or rightwards.

* * * * *